United States Patent [19]

Putzar et al.

[11] 4,300,900

[45] Nov. 17, 1981

[54] PROCESS AND DYE PREPARATIONS FOR PAD-DYEING

[75] Inventors: Roland Putzar, Therwil; Hans Fierz, Allschwil, both of Switzerland

[73] Assignee: Ciba-Geigy Corporation, Ardsley, N.Y.

[21] Appl. No.: 157,607

[22] Filed: Jun. 9, 1980

Related U.S. Application Data

[63] Continuation of Ser. No. 896,108, Apr. 13, 1978, abandoned.

[30] Foreign Application Priority Data

Apr. 19, 1977 [CH] Switzerland .................. 4809/77

[51] Int. Cl.³ .................. D06P 1/647; D06P 1/653; D06P 1/64; C09B 67/40
[52] U.S. Cl. .................. 8/524; 8/527; 8/584; 8/597; 8/598; 8/599
[58] Field of Search .................. 8/598, 524, 527, 597, 8/599, 584

[56] References Cited

U.S. PATENT DOCUMENTS

| | | | |
|---|---|---|---|
| 2,018,436 | 8/1935 | Brandt | 8/92 |
| 2,308,021 | 1/1943 | Munz | 8/87 |
| 3,077,487 | 2/1963 | Ramsey et al. | 8/92 |
| 3,078,136 | 2/1963 | Trosken et al. | 8/34 |
| 3,139,321 | 6/1964 | Clapp et al. | 8/17 |
| 3,158,434 | 11/1964 | Fleysher et al. | 8/34 |
| 3,484,180 | 12/1969 | Humphreys et al. | 8/34 |
| 3,652,200 | 3/1972 | Miyasaka | 8/92 |
| 3,676,051 | 7/1972 | Kangle et al. | 8/21 C |
| 3,894,840 | 7/1975 | Von der Eltz et al. | 8/30 |
| 3,951,598 | 7/1976 | Arashi et al. | 8/92 |
| 3,956,271 | 5/1976 | Blass et al. | 8/92 |
| 3,980,428 | 9/1976 | Fabbri et al. | 8/173 |

FOREIGN PATENT DOCUMENTS

| | | | |
|---|---|---|---|
| 40-4312923 | 9/1965 | Japan | 8/172 |
| 847059 | 9/1960 | United Kingdom | 8/173 |
| 966488 | 8/1964 | United Kingdom | 8/18 A |
| 1290602 | 9/1972 | United Kingdom | . |

OTHER PUBLICATIONS

Gard, A., J. Amer. Dyestuff Reporter Dec. 21, 1953 p. 867.

Leffingwell, G., Silk Journal & Rayon World for April 1944 pp. 30-33.

Roy, A. P., Amer. Dyestuff Reporter 12/8/52 pp. 844-845.

*Primary Examiner*—Joseph J. Schofer
*Assistant Examiner*—Maria Parrish Tungol
*Attorney, Agent, or Firm*—Edward McC. Roberts

[57] ABSTRACT

A dye preparation containing at least one dye insoluble or difficultly soluble in water, an anionic or nonionic dispersing agent, at least one metal complex consisting of a polyvalent cation and at least one complexing agent, and optionally further additives, water and/or organic solvent.

19 Claims, No Drawings

PROCESS AND DYE PREPARATIONS FOR PAD-DYEING

This is a continuation of application Ser. No. 896,108 filed on Apr. 13, 1978 now abandoned.

The invention relates to a process and dye preparations for pad-dyeing, to the production of the dye preparations and to the dyed textile material.

It is known that in the dyeing of textile materials by the continuous process, particularly with the use of dyes that are difficulty soluble to insoluble in water, unlevel dyeings are frequently obtained, the reason for which is, inter alia, that on drying of the impregnated and squeezed-out textile material the dyes to a lesser or greater extent migrate on the textile material. In order to overcome these disadvantages, it has already been suggested that special migration inhibitors be added to the padding bath. These known migration inhibitors are primarily high-molecular, water-soluble polymers, which in general cannot be incorporated into dye formulations because these inhibitors have an agglomerating effect and hence result in preparations which are unstable in storage. In the case of the vast majority of dyes, such products cannot be used moreover on account of their high viscosity. Furthermore, the degree of the reduction in migration can only be inadequately regulated by the use of these migration inhibitors.

It is also already known to add migration inhibitors to liquid dye preparations, for example as described in the U.S. Pat. No. 3,484,180 (methylcellulose) and in the U.S. Pat. No. 3,139,321 (mixture of monomeric and polymeric quaternary salts of dialkylaminoacrylacrylates) and also in the German Patent Specification No. 1,290,521 (tetraalkylbutyne-1,4-diols).

The main disadvantage of these known liquid dye preparations is however their poor storage stability and temperature stability, as well as their high viscosity.

The principal requirements which have to be satisfied in practice by dye preparations that are to be used in the continuous dyeing process are for example the following:

(a) they have to prevent the migration of the dyes during drying of the impregnated material;
(b) produce a level appearance;
(c) result in a good yield in the pad-steam-dyeing process;
(d) have as a liquid formulation a low viscosity so that they can be easily handled, are dosifiable without difficulty, and do not give rise to the problems associated with dusty dry products; and
(e) are above all stable in storage.

The object of the present invention was therefore to find dye formulations which incorporate all these advantages.

It has been found that specific metal complexes surprisingly both impart to the formulations good storage stability and reduce the dye migration of dyes insoluble or difficultly soluble in water, so that there are obtained level dyeings which moreover have good general fastness properties.

The invention relates therefore to solid and liquid dye preparations containing at least one dye insoluble or difficultly soluble in water, an anionic or nonionic dispersing agent, at least one metal complex which consists of a polyvalent cation and at least one complexing agent and which in the employed pH range, preferably 2 to 12, attains greater stability with increasing pH and which is preferably soluble in water, optionally further additives, water and/or organic solvent.

Suitable dyes that are difficultly soluble in water are those which have a solubility in water at a temperature of 20° C. of less than 5 g/liter of water. From a coloristic point of view, these are in particular disperse dyes, sulphur dyes and metal-complex dyes, which contain no groups ionising in water; and suitable water-insoluble dyes to be mentioned are vat dyes and organic pigments. These dyes can be selected from the widest range of chemical classes of dyes. The preparations can however also be mixtures of such dyes.

The disperse dyes applicable are for example nitro, aminoketone, ketonimine, methine, polymethine, nitrodiphenyleneamine, quinoline, benzimidazole, xanthene, oxazine, aminonaphthoquinone or coumarin dyes, and particularly anthraquinone and azo dyes such as mono- or disazo dyes, all free from carboxylic acid groups and/or sulphonic acid groups. In the case of vat dyes, these are dyes which are applied in a solid dispersed form to the fabric and which after development are again in a waterinsoluble form. The stated dyes are known.

The amounts of dye in the preparations vary within wide limits. If they are liquid preparations, they contain 10 to 50, preferably 20 to 30, percent by weight, and if they are solid preparations, they contain 10 to 90, preferably 20 to 50, percent by weight of dye, in each case relative to the total preparation.

Suitable dispersing agents are both nonionic and, preferably, anionic dispersing agents.

Suitable anionic dispersing agent are for example lignin sulphonates, particularly low-sulphonated lignin sulphonates, and sulphated lignin products, and also condensation products of naphthalene- or naphtholsulphonic acids or phenols with formaldehyde, polyvinylsulphonates or ligninsulphonic acids, fatty acids, resinic acids, gallic acids, sulphated primary aliphatic alcohols having 10 to 18 carbon atoms, sulphated unsaturated fatty acids, fatty acid ethers, fatty acid amides, sulphated alkylene oxide adducts; sulphated partially esterified polyhydric alcohols, alkylsulphonates, alkylarylsulphonates, alkylnaphthalenesulphonates, sulphonates of esters and amides of polycarboxylic acid, and condensation products of fatty acids with aminoalkylsulphonates, and also suitable mixtures of the aformentioned compounds.

The anionic dispersing agents are usually in the form of their alkali metal salts, their ammonium salts or their water-soluble amine salts.

Suitable nonionic dispersing agent are for example: addition products of, e.g., 5 to 100 mols of alkylene oxide, especially ethylene oxide, with higher fatty acids, with saturated or unsaturated fatty alcohols, with fatty acid amides or with alkylphenols, the alkyl moieties of which contain at least 7 carbon atoms, and some of the ethylene oxide units may be substituted by propylene oxide.

Owing to the use according to the invention of the metalcomplex salts, the dispersing agents can be added in amounts much greater than usual to the preparation, and consequently a much higher storage stability of the preparation is ensured. They are used in the liquid preparations in an amount of 1 to 30 preferably 1 to 10, percent by weight, and in the solid preparations in an amount of 1 to 80, preferably 30 to 60, percent by weight, in each case relative to the total preparation.

The metal-complex compounds usable according to the invention are primarily chelate complexes consisting of a polyvalent, especially divalent, cation such as magnesium, calcium, strontium, barium or iron(III), preferably magnesium or calcium, and at least one complexing agent which forms in a known manner, by linkage of several different atoms of its molecule with a central atom, at least one complex ring.

The metal complexes usable according to the invention have to be unstable and capable of being split under dyeing conditions, i.e. at low pH values, but in the dye preparations with high pH values they have to be stable, and are preferably colourless.

With regard to the complexing agents, these are mainly so-called polydentate complexing agents, for example complexforming polycarboxylic acids, such as aliphatic hydroxycarboxylic acids and derivatives thereof, such as lactic acid, tartaric acid, glycolic acid, tetrahydroxysuccinic acid, citric acid or saccharic acid; aromatic o-hydroxycarboxylic acids, such as 1-hydroxybenzene-2-carboxylic acid or 6- or 5- or 4-methyl-1-hydroxybenzene-2-carboxylic acid.

It is also possible to use sulphur containing and phosphoruscontaining derivatives of aliphatic and aromatic carboxylic acid and organic compounds containing hydroxyl groups, such as 1,2-dihydroxybenzene-3,5-disulphonic acid, sulphosalicylic acid, 2-[N,N-bis-(carboxymethyl)]-amino-3-sulphopropionic acid or 1-phosphonobutane-2,3,4-tricarboxylic acid.

Also suitable are other types of complexing agents which are known as "detergent builders", for example from the German Offenlegungsschriften Nos. 2,165,773 and 2,164,872, and from the French Patent Specification No. 2,156,719.

Of particular interest are mono- and polyamino-(lower aliphatic)-carboxylic acids, particularly mono- and polyaminoacetic acids, such as ethylenediaminetetraacetic aicd, nitrilotriacetic acid, N-hydroxyethylethylenediaminotriacetic acid, glycine, sarcosine, ethylene-bis-(oxyethylene-nitrilo)tetraacetic acid, cyclohexyldiaminetetraacetic acid and iminodiacetic acids.

Depending on the charges of the central atom and of the complexing agents, the whole chelate complex is neutral, anionic or cationic. In the two last-mentioned cases, it is in the form of salt with cations, such as ions of hydrogen, alkali metals and ammonium, or with anions such as ions of hydroxyl, halides, sulphates and nitrates.

The metal complexes to be used are known. They can also be formed however from the complexing agent and a polyvalent metal salt in situ in the production of the formulation.

The amount of metal complex in the liquid preparations is 0.1 to 20, preferably 1 to 10, percent by weight, and in the solid preparations it is 1 to 60, preferably 20 to 50, percent by weight, in each case relative to the total preparation.

The further additives which can be added to the liquid formulations are in particular biological stabilising agents, for example bactericides such as an aqueous formaldehyde solution, and fungicides such as pentachlorophenolate; humectants such as ethylene glycol or propylene glycol, sorbitol and glycerol; antifoaming agents, and thickening additives such as protective colloids, starch, dextrins, albuminous substances (casein), alginates, gelatin, carboxymethylcellulose, polyvinylpyrrolidone and polyacrylates.

These additives are used in amounts of 0.1 to 40 percent by weight, usually in amounts of 0.1 to 25 percent by weight, relative to the total preparation. The humectants are employed preferably in amounts of 5 to 30, especially 10 to 20, percent by weight, and the biological stabilising agents preferably in amounts of 0.1 to 10, particularly 0.1 5, percent by weight.

The liquid preparations in addition contain water or organic solvents, such as glycols and other water-miscible organic solvents, on their own or in admixture with water.

The liquid formulations are obtained by mixing the dye insoluble or difficultly soluble in water, or a mixture of such dyes, optionally in the form of press cake, together with the, preferably anionic, dispersing agent, water and/or organic solvent, as well as optionally the further additives; homogenising the mixture at room temperature for about 10 to 30 minutes; and bringing the pH value of the dispersion to about 7 to 10. The complete metal complex or the components, i.e. the complexing agent and the polyvalent metal salt, is or are then added whilst the pH value is maintained constant. This dispersion is subsequently ground until the particle size of the dye is smaller than $10\mu$, particularly smaller than $2\mu$, and the grinding auxiliary is afterwards separated from the dispersion.

The dye dispersion obtained has a low viscosity, is very readily pourable and is stable over several months at $-10°$ C. to room temperature, and over several weeks at room temperature to $60°$ C.

Solid formulations are obtained by a careful drying of the dispersion obtained above, e.g., by means of freeze drying or spray drying.

The liquid and solid dye preparations according to the invention are used in particular in a continuous dyeing process (pad-dyeing process) for textile materials which can be dyed with dyes insoluble or difficultly soluble in water. With the use of vat dyes, the dye preparations can be advantageously used for continuously dyeing cellulose; with the use of disperse dyes advantageously for continuously dyeing polyester materials; or with the use of vat dyes and disperse dyes advantageously for continuously dyeing mixed fabrics made from polyester and cellulose, with the textile material, subsequent to the impregnating and squeezing operation, being intermediately dried, for example for 2 to 3 minutes at $100°$ to $120°$ C.

By virtue of the metal complexes usable according to the invention, it is possible to obtain in continuous processes level dyeings as a result of being able to control the migration of the dyes by adjusting or lowering the pH value in the padding liquor. At pH value in the padding liquor of preferably 3 to 6, the stability of the metal complexes decreases, which renders possible a control of migration, particularly during drying of the impregnated material.

The invention relates also to a process for continuously dyeing textile material, especially polyester or cellulose fibres or mixtures thereof, with dyes insoluble or difficultly soluble in water by application of an aqueous dye-padding liquor, whereby there is (are) firstly added to this padding liquor the metal complex as defined or the precursors thereof, i.e. polyvalent metal salts and complexing agents, so that the complex is produced in situ in the padding liquor. The material is subsequently dried and finished in the customary manner. The metal complex is used in this operation in an amount of 0.2 to 20 g/l, preferably 1 to 5 g/l, based on the aqueous padding liquor.

The invention is illustrated by the following Examples without being limited to them. Temperatures are given in degrees Centigrade, and 'parts' denote parts by weight. The individual tests were carried out as described in the following.

Migration Test (modified AATCC Test 140-1974 at 120° C.)

A freshly padded cotton fabric is pinned onto the frame of a dryer, and a 9 cm watch glass is placed onto the fabric. The fabric is subsequently dried for 1 minute at 120° C. with normal air circulation on both sides.

Evaluation

Difference in strength of colour between the area covered by the watch glass and the uncovered area by means of the Gray Scale for assessing change in colour, and/or by remission measurements.

Evaluation according to the Gray Scale for assessing colour change:

(a) Mathematical determination of the Gray Scale values by colorimetric measurement of the difference in colour strength, expressed in NBS units according to the colour difference formula of Adams-Nickerson (broken down with respect to shade, brightness and saturation). The following evaluation scale was established on the basis of the correlation between difference in colour strength and the calculated Gray Scale values:

| Difference in colour strength in % | Gray Scale value |
|---|---|
| 90–66 } severe migration | <1 |
| 65–55 | 1 |
| 54–45 } moderate to slight migration | 1–2 |
| 44–37 | 2 |
| 36–26 | 2–3 |
| 25–20 | 3 |
| 19–13 | 3–4 |
| 12–9 } negligible migration | 4 |
| 8–4 } to no migration at all | 4–5 |
| 3–0 | 5 |

Visual evaluation according to Gray Scale for assessing change in colour:

(b) In all those cases where measurements were not possible.

Storage stability test

The liquid dye preparation is stored in a closed bottle for 14 days at +40° C. and −10° C., respectively. An amount of 15 g of the preparation is then stirred together with 1 liter of desalted water for 2 minutes on a magnetic stirrer at a speed of 750 r.p.m.; the liquor is then filtered through a cloth filter (cotton), and the filter is rinsed with 100 ml of desalted water. For storage stability to be rated as being good, there has to be no filter residue remaining on the cloth filter.

Paper filter test 200 ml of the dye dispersion, which has been diluted with water to have a dye content of 0.1%, is filtered under reduced pressure through a paper filter SS 1450 CV having a diameter of 7 cm and the given size of pores. The paper filter is then washed on the suction filter with 50 ml of water. After the washed filter paper has been dried at 70° to 80° C., the filter test results are assessed on the basis of the following ratings:

| Filter test results | Filter test ratings |
|---|---|
| no residue, filter paper slightly stained | 5 very good |
| no residue, filter paper clearly stained | 4 good |
| slight residue | 3 satisfactory |
| medium amount of residue | 2 unsuitable |
| large amount of residue difficult to filter, coarse agglomerates | 1 unsuitable |

EXAMPLE 1

(a) In a glass-ball mill (diameter of glass balls 2 to 4 mm), 50 parts by weight of the green vat dye of the formula

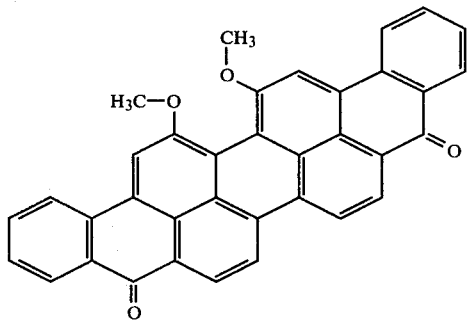

are mixed with 12 parts by weight of a low-sulphonated lignin sulphonate as dispersing agent, 30 parts by weight of ethylene glycol and 84 parts by weight of water. Into the homogeneously ground material are subsequently added 11 g of citric acid and then 3 g of magnesium hydroxide. Finally, the pH value is adjusted with KOH to about 8 to 9. From the components last to be added there is formed the potassium salt of the Mg-citrate complex which is stable at pH 8 to 9 and water-soluble. Grinding is then continued for 6 hours up to a grinding end point at which, with a size of pore of 3 to 4μ, there remains in the paper filter test only a slight residue on the paper filter, which is denoted by the rating 4. The grinding operation presents no problems, and yields a liquid, storage-stable formulation. Even after storage at 40° for 14 days, the high degree of dispersity is retained.

The resulting preparation contains 25% of dye, 6% of dispersing agent, 15% of ethylene glycol, 12% of potassium salt of the magnesium-citrate complex and 42% of water.

(c) With the use of, for example, 40 g/l of this dye preparation for padding a cotton fabric in the pad-steam process, which proceeds by way of padding and intermediate drying, the abovementioned potassium salt of the magnesium-citrate complex effects during the intermediate drying, when the pH value of the padding liquor has been adjusted to 3.5 with acetic acid, a clear reduction in the migration of the dye particles to the outer areas of the cotton fabric. Dye formulations without the said magnesium-citrate complex addition yield a dyeing which is characterised by severe migration, so that even after the complete dyeing process there is inadequate dyeing penetration of the dyed material, i.e., the dyeing is uneven.

EXAMPLE 2

(a) In the same grinding device as described in Example 1, 42 parts by weight of the olive-green vat dye of the formula

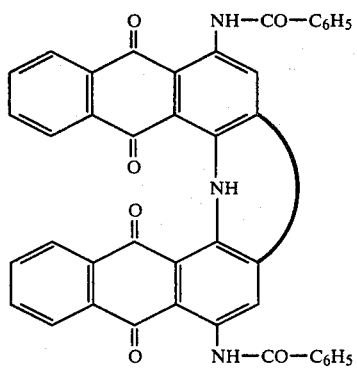

are mixed with 14 parts of a lignin sulphonate as dispersing agent, 30 parts of ethylene glycol and 98 parts of water. Into the homogeneously ground material are then added 16 parts of nitrilotriacetic acid and subsequently 5.2 parts of calcium hydroxide, and the pH value is afterwards adjusted with KOH to about 8 to 9. From these last-mentioned components is formed the potassium salt of the calcium-nitriloacetate complex, which is stable at pH 8 to 9 and water-soluble. Grinding then proceeds for 2-3 hours to an end point similar to that in Example 1. The resulting liquid formulation is thinly liquid and stable in storage even at 40° C. It contains 21% of dye, 7% of dispersing agent, 15% of ethylene glycol, 8% of potassium salt of the calcium-nitrilotriacetate complex and 49% of water.

(b) If this dye preparation is used in an amount of, e.g., 40 g/l for padding a cotton fabric, with the pH value of the padding liquid being brought to 4 with acetic acid, a level dyeing is obtained, whereas an unlevel dyeing is obtained with a dye preparation without the above-mentioned calcium-nitrilotriacetate complex.

EXAMPLE 3

(a) In the same grinding device as in Examples 1 and 2, 33 parts of the orange disperse dye of the formula

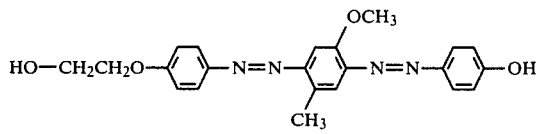

are mixed with 20 parts of a lignin sulphonate dispersing agent, 40 parts of ethylene glycol and 75 parts of water. There are then mixed in 32 parts of nitrilotriacetic acid and subsequently 10.4 parts of $Ca(OH)_2$. After adjustment of the pH value with NaOH to about 8, grinding is continued for 15 hours to reach the same grinding end point as in Example 1. The formulation is liquid and stable in storage. In contains 16.5% of dye, 10% of dispersing agent, 20% of ethylene glycol, 16% of sodium salt of the calcium-nitrilotriacetate complex and 37.5% of water.

(b) If a polyester/cotton mixed fabric is padded with a padding liquor containing, e.g., 40 g/l of this preparation, the pH value of which has been adjusted to 3 to 4, a level dyeing is obtained.

EXAMPLE 4

(a) In the same grinding device as described in Example 1, 40 parts by weight of the brown vat dye of the formula

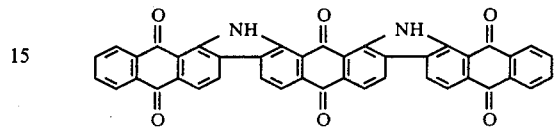

are mixed with 10 parts of an oxylignin sulphonate as dispersing agent, 30 parts of ethylene glycol and 108 parts of water. Into the homogeneously ground material are subsequently added 8.6 parts of glycine and then 3.4 parts of $Mg(OH)_2$. During the following grinding for 14 hours, the Mg-glycinate complex is formed and a pH value of 9.5 is established. There is finally obtained a liquid storage-stable formulation containing 20% of crude dye, 5% of dispersing agent, 15% of ethylene glycol as humectant, 5% of the magnesium complex and 55% of water.

(b) If this dye preparation is used in an amount of, e.g., 50 g/l for padding a cotton fabric, with the pH value of the liquor being brought to 4-5 with acetic acid, a level dye distribution is obtained after intermediate drying of the fabric. The same formulation but without the complex produces after intermediate drying an uneven dye distribution.

EXAMPLE 5

(a) Using the same dye and the same procedure as in Example 4, there is produced from the sodium salt of EDTA (ethylenediaminetetraacetic acid) and aluminium nitrate, in place of glycine and $Mg(OH)_2$, a liquid formulation containing 2% of the Al-EDTA complex. The complex forms, during grinding, from the sodium salt of EDTA and $Al(NO_3)_3$. The formulation is liquid and stable in storage.

(b) On application of the formulation on cotton fabric in the padding process, there is obtained after intermediate drying a level distribution of the dye.

EXAMPLE 6

(a) In the same grinding device as described in Example 1, 36 g of the yellow vat dye of the formula

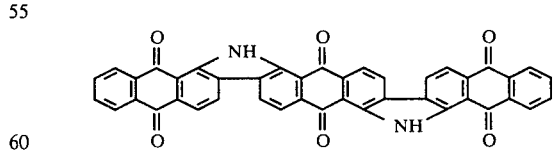

is mixed with 6 g of a lignin sulphonate and 136 g of water. Into this mixture are added 15.5 g of glycine and 6.1 g of $Mg(OH)_2$, which during subsequent stirring for 10 hours react to give 18 g of Mg-glycinate. The ground material is then spray dried under mild conditions (ingoing-air temperature 140° C./outgoing-air temperature 70°-75° C.). The resulting final composition of the powder is 60% of crude dye, 10% of lignin sulphonate and 30% of Mg-glycinate.

(b) If 16 g/l of this dye preparation is used to produce a padding liquor, with the pH value being brought to 4–5 with acetic acid, there is obtained after padding and intermediate drying a level dye distribution in the cotton material. The migration of the dye in the fabric can therefore be controlled by means of the pH adjustment. A similar dye preparation without the Mg complex produces an undesirably high level of migration.

We claim:

1. A storage-stable solid or liquid dye preparation consisting essentially of at least 10% of at least one dye, insoluble or difficultly soluble in water; an anionic or nonionic dispersing agent; at least one colorless metal complex which is stable in said preparation but unstable and capable of splitting under dyeing conditions at a pH of 3 to 6 and consisting of an alkaline earth metal or trivalent metal cation and at least one polydentate complexing agent; alone or in the presence of further biological stabilizing, humectant or thickening additives, water, organic water-miscible solvents or mixtures thereof, said colorless metal complex being present in said solid preparation in an amount of 1 to 60% by weight and in said liquid preparation in an amount of 0.1 to 20% by weight relative to the total preparation.

2. A dye preparation according to claim 1, wherein the metal complex is soluble in water.

3. A dye preparation according to claim 1, which contains a metal complex consisting of an alkaline-earth metal ion, and a complexing agent.

4. A dye preparation according to claim 3, which contains a metal complex having a calcium or magnesium ion.

5. A dye preparation according to claim 1, which contains a metal complex consisting of an aluminium ion, and a complexing agent.

6. A dye preparation according to claim 1, which contains a metal complex of which the complexing agent is nitrilotriacetic acid, ethylenediaminetetraacetic acid, glycine or citric acid.

7. A dye preparation according to claim 1, which contains as metal complex the calcium or magnesium complex of nitrilotriacetic acid, ethylenediaminetetraacetic acid or citric acid.

8. A dye preparation according to claim 7, which contains, as dyes insoluble or difficultly soluble in water, vat dyes, sulphur dyes, disperse dyes or mixture thereof.

9. A liquid dye preparation according to claim 1, which contains water or water-soluble organic solvent, or a mixture of water and water-soluble organic solvent.

10. A liquid dye preparation according to claim 1, which contains, as further additives, humectants, bactericides or fungicides.

11. A liquid dye preparation according to claim 1, which contains 10 to 50 percent by weight of dye, 1 to 30 percent by weight of an anionic dispersing agent, 0.1 to 20 percent by weight of a metal complex, 0.1 to 40 percent by weight of further additives, and the rest water.

12. A liquid dye preparation according to claim 1, which contains 20 to 30 percent by weight of dye, 1 to 10 percent by weight of an anionic dispersing agent, 1 to 10 percent by weight of a metal complex, 10 to 20 percent by weight of humectant, optionally 0.1 to 5 percent by weight of biological stabilising agent, and the rest water.

13. A solid dye preparation according to claim 1, which contains 10 to 90 percent by weight of dye, 1 to 80 percent by weight of an anionic dispersing agent and 1 to 60 percent by weight of a metal complex.

14. A solid dye preparation according to claim 13, which contains 20 to 50 percent by weight of dye, 30 to 60 percent by weight of an anionic dispersing agent and 20 to 50 percent by weight of a metal complex.

15. In a process for dyeing textile material containing polyester or cellulose fibers or mixtures thereof by the application of an aqueous dye-padding liquor containing at least 10% of at least one dye which is insoluble or difficultly soluble in water, an anionic or nonionic dispersing agent, in the presence or absence of further biological stabilizing, humectant or thickening additives, or mixtures thereof, to the textile material, the improvement wherein said padding liquor contains 0.2 to 20 grams per liter of at least one colorless metal complex, of a polyvalent cation and at least one polydentate complexing agent, capable of splitting under a low pH dyeing condition, and adjusting the pH to a value of 3 to 6 to obtain said low pH dyeing condition and control dye migration.

16. A process according to claim 15, wherein said padding liquor contains 1 to 5 grams per liter of said metal complex.

17. A process according to claim 15, wherein said metal complex is prepared in situ by the addition of said complexing agent and a polyvalent metal salt to said dye-padding liquor.

18. A process according to claim 15 which is a continuous process.

19. A process according to claim 15, wherein said polyvalent cation is an alkaline earth metal cation.

* * * * *